(12) United States Patent
Saitoh et al.

(10) Patent No.: US 7,382,563 B2
(45) Date of Patent: Jun. 3, 2008

(54) STORAGE APPARATUS, AND CONTROL METHOD AND PROGRAM

(75) Inventors: Shunji Saitoh, Kawasaki (JP); Atsushi Suzuki, Kawasaki (JP); Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 11/340,229

(22) Filed: Jan. 26, 2006

(65) Prior Publication Data

US 2007/0097543 A1 May 3, 2007

(30) Foreign Application Priority Data

Oct. 31, 2005 (JP) .............................. 2005-316488

(51) Int. Cl.
*G11B 19/04* (2006.01)

(52) U.S. Cl. ..................................... 360/60; 360/78.04

(58) Field of Classification Search ...................... None
See application file for complete search history.

(56) References Cited

U.S. PATENT DOCUMENTS 5,638,307 A * 6/1997 Kamimura et al. ......... 713/321
7,143,002 B2 * 11/2006 Hirano ........................ 702/141
7,253,982 B1 * 8/2007 Brunnett et al. .............. 360/60
7,321,477 B2 * 1/2008 Suzuki et al. ................. 360/60
2003/0103286 A1 * 6/2003 Bi et al. ....................... 360/60

FOREIGN PATENT DOCUMENTS

| EP | 0 332 317 A2 * | 9/1989 |
| JP | 7-6487 | 1/1995 |
| JP | 7-61320 | 3/1995 |

\* cited by examiner

*Primary Examiner*—Andrea Wellington
*Assistant Examiner*—Varsha A. Kapadia
(74) *Attorney, Agent, or Firm*—Greer, Burns & Crain, Ltd.

(57) ABSTRACT

Upon obtaining a detection signal of a shock sensor that detects a shock applied to an apparatus for output, a write disabling unit disables writing by a head on a medium over a predetermined time corresponding to a shock convergence. A determining unit determines, during the write disable, whether an output of the shock sensor is a detection output of the shock sensor due to a shock or an erroneous detection output of the shock sensor due to power supply fluctuations. A sensitivity control unit increases a detection sensitivity of the shock sensor when the determining unit determines that the output is a detection output due to the shock, and decreases the detection sensitivity of the shock sensor and clears the write disable when the determining unit determines that the output is an erroneous detection output due to power supply fluctuations.

20 Claims, 11 Drawing Sheets

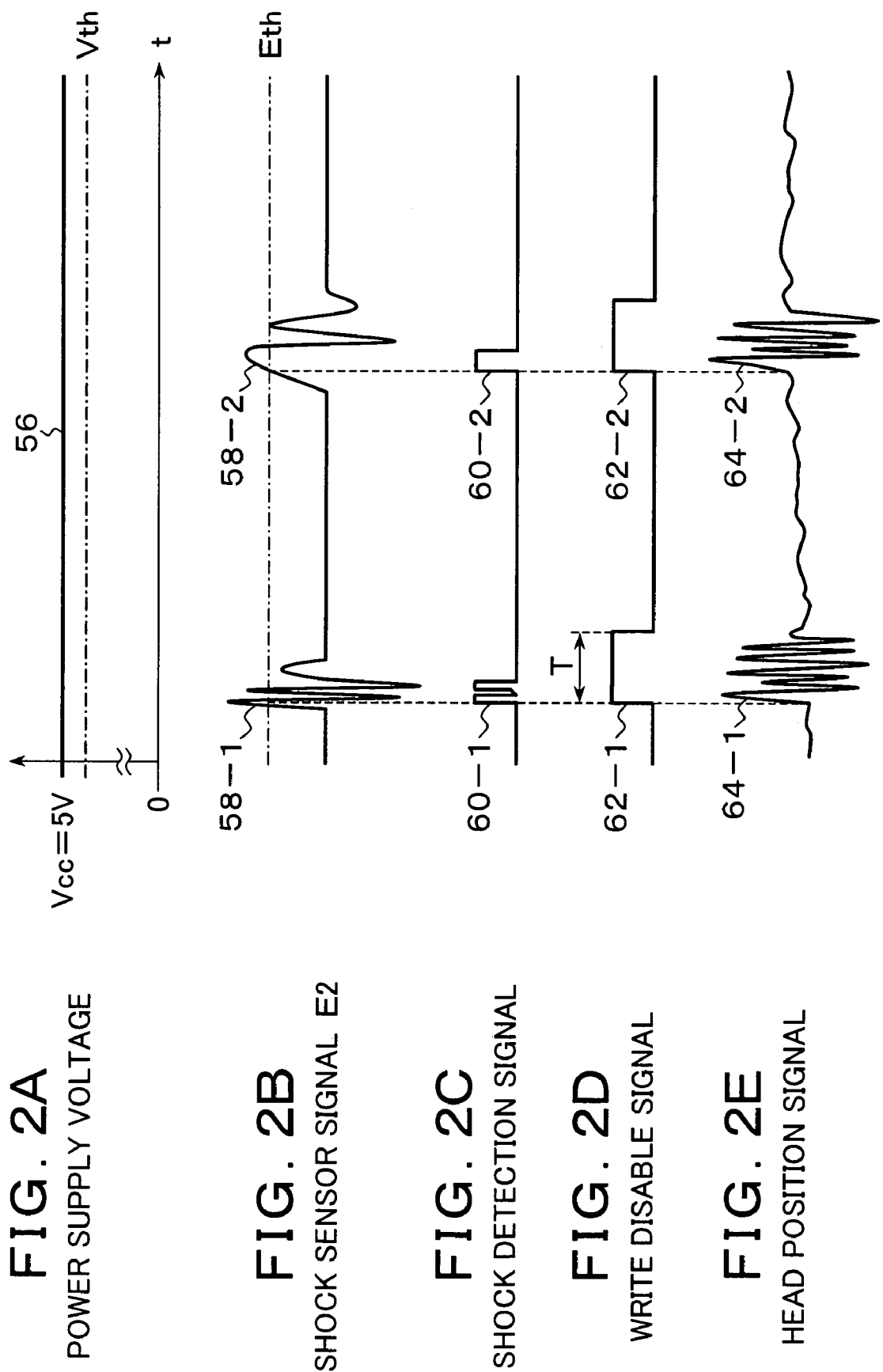
FIG. 2A POWER SUPPLY VOLTAGE
FIG. 2B SHOCK SENSOR SIGNAL E2
FIG. 2C SHOCK DETECTION SIGNAL
FIG. 2D WRITE DISABLE SIGNAL
FIG. 2E HEAD POSITION SIGNAL

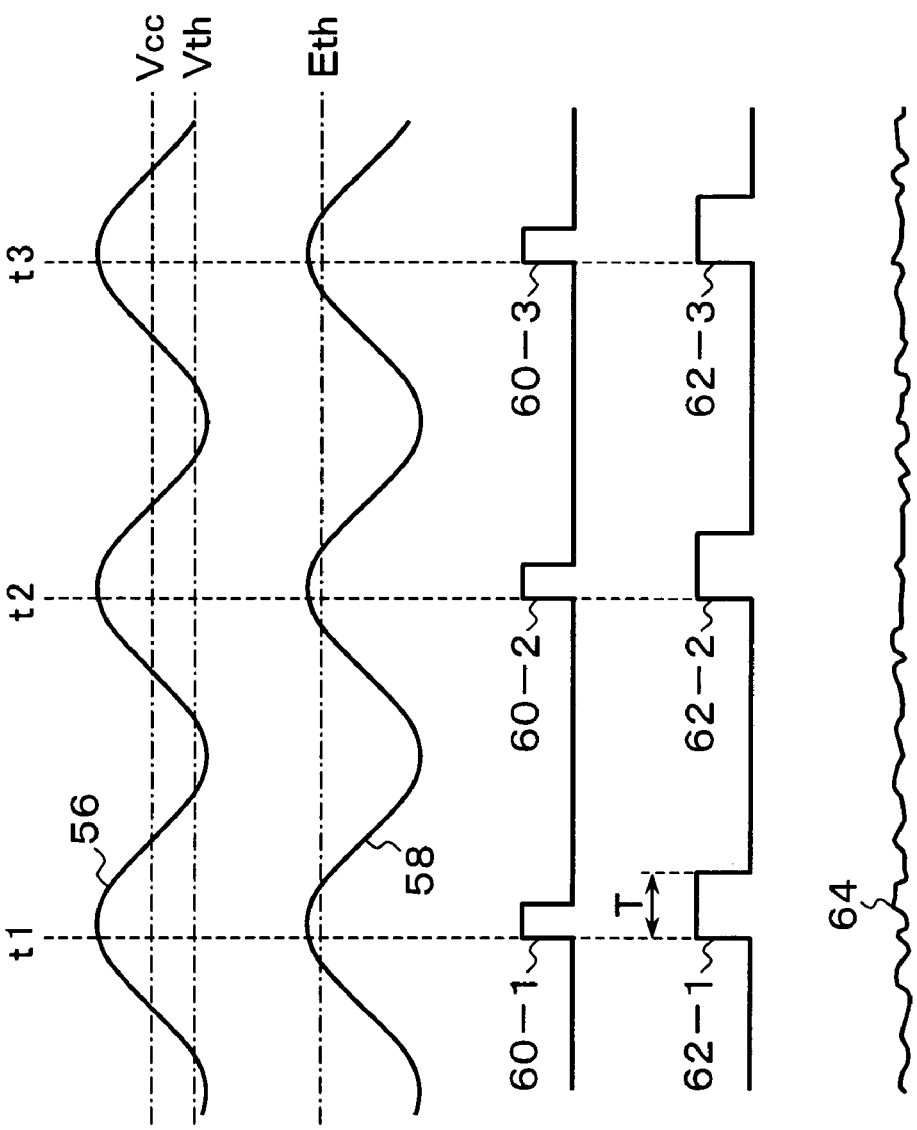
FIG. 3A POWER SUPPLY VOLTAGE
FIG. 3B SHOCK SENSOR SIGNAL E2
FIG. 3C SHOCK DETECTION SIGNAL
FIG. 3D WRITE DISABLE SIGNAL
FIG. 3E HEAD POSITION SIGNAL

POWER SUPPLY FLUCTUATIONS

SHOCK

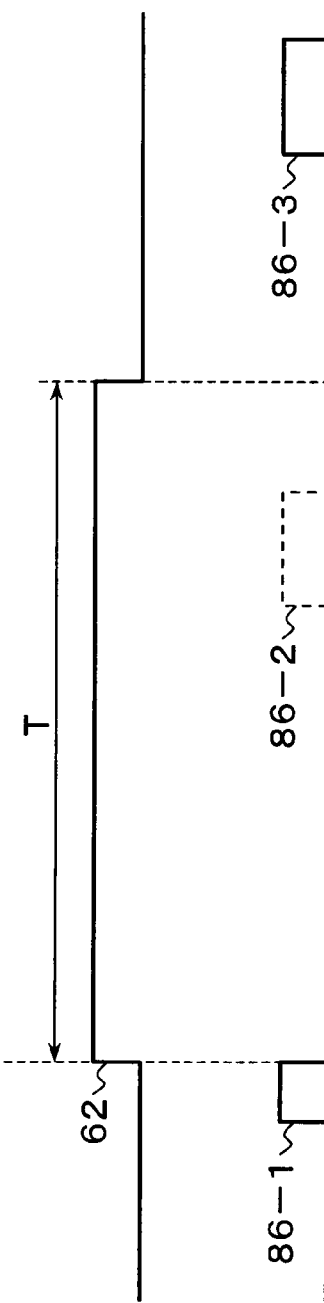
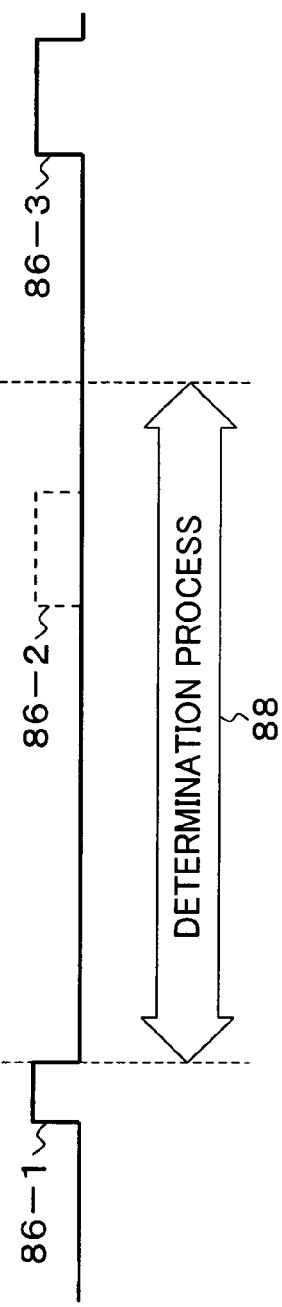
FIG. 6A
INDEX SIGNAL
FIG. 6B
SHOCK DETECTION SIGNAL
FIG. 6C
WRITE DISABLE SIGNAL
FIG. 6D
WRITE GATE SIGNAL

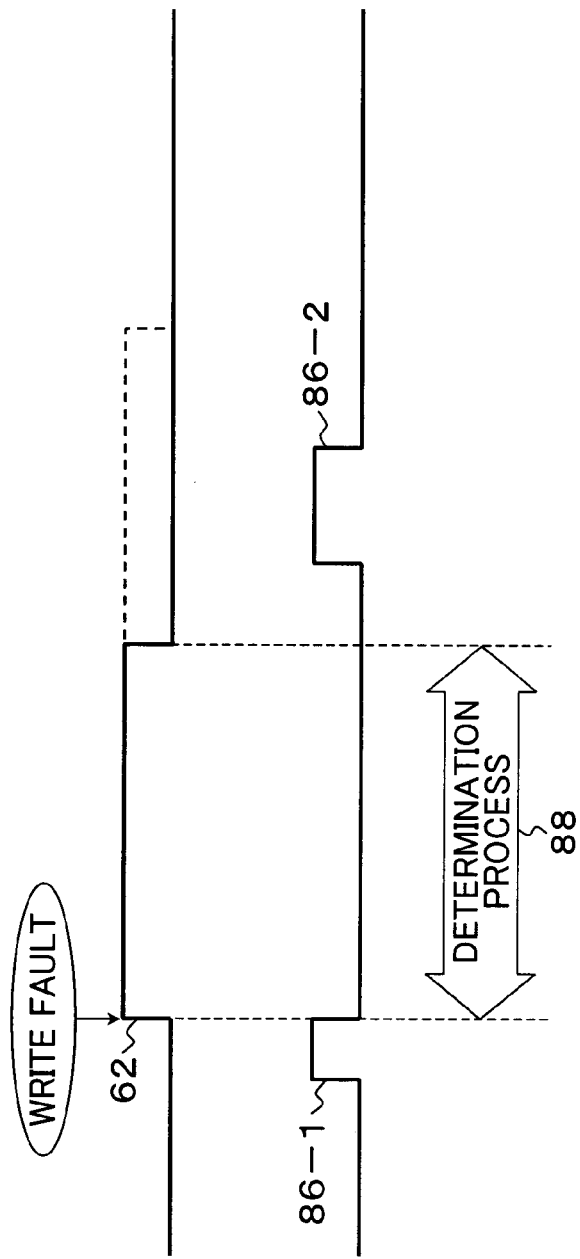

STORAGE APPARATUS, AND CONTROL METHOD AND PROGRAM

This application is a priority based on prior application No. JP 2005-316488, filed Oct. 31, 2005, in Japan.

BACKGROUND OF THE INVENTION

1. Field of the Invention

The present invention is a storage apparatus, such as a magnetic disk apparatus equipped with a shock sensor, and its control method and program and, particularly, to a storage apparatus that protects information stored in a medium by detecting a shock to disable writing, and its control method and program.

2. Description of the Related Arts

Conventionally, as for a storage apparatus, such as a magnetic disk apparatus, a shock sensor is placed in the storage apparatus to determine that a detection output of the shock sensor when a shock is externally applied exceeds a predetermined threshold and disable a writing operation during a predetermined time until an impact by shock converges, thereby achieving protection so that data is prevented from being destroyed by writing onto an adjacent cylinder with a head actuator being vibrated by shock. Here, as a shock sensor for use in a storage apparatus, a piezoelectric element is used for example. When a power supply voltage of the storage apparatus is fluctuated, output fluctuations also occur in an output of the shock sensor in accordance with power supply fluctuations, thereby erroneously detecting a shock. As such, if an output of the shock sensor is erroneously detected due to power supply fluctuations, in the case where a write command is being executed at this timing, write disable causes a write fault, and then a retry is performed. However, if an erroneous detection occurs due to power supply fluctuations even at the time of retry, write disable causes the retry to become at fault, thereby possibly causing an error termination. To get around this problem, in a conventional storage apparatus, a process of invalidating a detection output of the shock sensor at the time of a specific retry is performed, in which a writing operation is performed by ignoring an erroneous operation of the shock sensor.

[Patent Document 1] Japanese Patent Laid-Open Publication No. 7-61320

[Patent Document 2] Japanese Patent Laid-Open Publication No. 7-6487

However, in such a conventional storage apparatus in which a writing operation is performed by invalidating a detection output of the shock sensor at the time of a specific write retry, if a shock is actually applied while the detection output of the shock sensor is invalidated, the shock cannot be detected, and a writing operation is performed in the state where the shock is applied, thereby posing a problem of destroying data in an adjacent cylinder. Moreover, at the time of an erroneous detection of the shock sensor due to fluctuations in power supply voltage, writing is disabled until a specific retry is performed, thereby posing a problem of worsening writing capability.

SUMMARY OF THE INVENTION

According to the present invention is to provide a storage apparatus, and its control method and program that improve access capability by preventing an erroneous operation due to a detection output of a shock sensor.

The present invention provides a storage apparatus. The storage apparatus according to the present invention includes:

a shock sensor that detects a shock applied to the apparatus for output;

a write disabling unit that disables, when a detection signal of the shock sensor is obtained, writing by a head on a medium over a predetermined time corresponding to a shock convergence;

a determining unit that determines, during the write disable, whether an output of the shock sensor is a detection output of the shock sensor due to a shock or an erroneous detection output of the shock sensor due to power supply fluctuations; and a sensitivity control unit that increases a detection sensitivity of the shock sensor when the determining unit determines that the output is a detection output due to the shock, and decreases the detection sensitivity of the shock sensor and clears the write disable when the determining unit determines that the output is an erroneous detection output due to power supply fluctuations.

Here, the determining unit includes:

a first determining unit that determines, from a position signal of the head, whether the output of the shock sensor is an output due to a shock or an output due to power supply fluctuations;

a second determining unit that determines, by monitoring decreasing fluctuations of a power supply voltage with respect to a rated voltage, whether the output of the shock sensor is an output due to a shock or an output due to power supply fluctuations;

a third determining unit that determines, from an output behavior of the shock sensor, whether the output of the shock sensor is an output due to a shock or an output due to power supply fluctuations; and a determination output unit that supplies, as a determination result, an output indicative of power supply fluctuations when at least any one of the first to third determining units determines that the output is an output due to power supply fluctuations, and supplies, as a determination result, an output indicative of an output due to a shock when all of the first to third determining units determine that the output is an output due to a shock.

The determining unit causes the detection sensitivity of the shock sensor to be increased to generate a pseudo writing operation state corresponding to a writing operation state during a determination period in write disable, and forcefully fluctuates the power supply voltage in a range not smaller than the rated voltage.

The third determining unit integrates an output signal of the shock sensor over a defined period, determines that the output is an output due to power supply fluctuations when an integration value is linearly changed, and determines that the output is an output due to a shock when the integration value is non-linearly changed.

Also, the third determining unit integrates an output signal of the shock sensor over a defined period, calculates a total sum of absolute values of differences with integration values with respect to a straight line connecting an integration initial value and an integration end value, determines that the output is an output due to power supply fluctuations when the difference total sum is either one of 0 and not larger than a predetermined value, and determines that the output is an output due to a shock when the difference total sum exceeds the predetermined value.

The sensitivity control unit initially sets a gain of an amplifier that amplifies the detection signal of the shock sensor as a default gain, upon reception of an instruction for putting the detection sensitivity up, increases the gain of the amplifier by a predetermined gain until the gain reaches a maximum gain, and, upon reception of an instruction for putting the detection sensitivity down, decreases the gain of the amplifier by the predetermined gain until the gain reaches a minimum gain.

The write disabling unit disables writing over the predetermined time also when a write fault associated with an execution of a write command is detected. The determining unit starts a determination operation in conjunction with the write disable associated with the write fault at the write disabling unit and, upon determination that the output is an output due to power supply fluctuations, immediately clears the write disable and then causes a retry in response to the write fault to be performed.

The present invention provides a storage apparatus controlling method. The storage apparatus controlling method includes:

a write disabling step of disabling, when a detection signal of a shock sensor that detects a shock applied to an apparatus for output is obtained, writing by a head on a medium over a predetermined time corresponding to a shock convergence;

a determining step of determining, during the write disable, whether an output of the shock sensor is a detection output of the shock sensor due to a shock or an erroneous detection output of the shock sensor due to power supply fluctuations; and a sensitivity control step of increasing a detection sensitivity of the sock sensor when it is determined in the determining step that the output is a detection output due to the shock, and decreasing the detection sensitivity of the shock sensor and clearing the write disable when it is determined in the determining step that the output is an erroneous detection output due to power supply fluctuations.

The present invention provides a program executed by a computer of a storage apparatus. The program according to the present invention causes the computer of the storage apparatus to execute steps including:

a write disabling step of disabling, when a detection signal of a shock sensor that detects a shock applied to an apparatus for output is obtained, writing by a head on a medium over a predetermined time corresponding to a shock convergence;

a determining step of determining, during the write disable, whether an output of the shock sensor is a detection output of the shock sensor due to a shock or an erroneous detection output of the shock sensor due to power supply fluctuations; and a sensitivity control step of increasing a detection sensitivity of the sock sensor when it is determined in the determining step that the output is a detection output due to the shock, and decreasing the detection sensitivity of the shock sensor and clearing the write disable when it is determined in the determining step that the output is an erroneous detection output due to power supply fluctuations.

According to the present invention, when a detection output of the shock sensor is obtained, it is determined whether the detection output is a detection output due to fluctuations in power supply voltage or a detection output due to a shock and, in accordance with the determination result, an optimal shock sensor sensitivity is set. With this, prevention of deterioration in writing capability due to an erroneous detection output of the shock sensor and prevention of data destruction by writing in an adjacent traffic due to a shock can both be achieved. Also, while the detection output of the shock sensor is determined as representing write disable, the detection sensitivity of the shock sensor is increased, thereby reducing dependency on variations individual shock sensors and achieving an accurate determination. At the same time, since fluctuations in power supply voltage are increased during a writing operation, while it is determined that the writing operation is disabled, a pseudo writing operation state corresponding to the writing operation is generated in a pseudo manner for determination. With this an erroneous detection due to power supply fluctuations is accurately determined. Furthermore, when writing is disabled based on the detection output of the shock sensor by using a write disabling function provided in advance for a write fault, even when writing is disabled due to a normal write fault associated with the execution of a write command, a determining process is performed at a predetermined time similarly in the case of the detection output of the shock sensor. If it is determined in the course of the process that the output is due to fluctuations in power supply voltage, the write disable is cleared at this moment, thereby allowing a retry due to a write fault to be performed without waiting for a predetermined determining time to pass and preventing a deterioration in write capability due to superfluous rotational latency. The above and other objects, features, and advantages of the present invention will become more apparent from the following detailed description with reference to the drawings.

BRIEF DESCRIPTION OF THE DRAWINGS

FIGS. 2A to 2E are time charts of a power supply voltage, a shock sensor output, a shock detection signal, a write disable signal, and a head position signal when shock is applied;

FIGS. 3A to 3E are time charts of a power supply voltage, a shock sensor output, a shock detection signal, a write disable signal, and a head position signal when power supply is aluctuated;

FIGS. 6A to 6D are time charts showing delay of tray timing associated with write disable and a determination process;

FIGS. 7A to 7D are time charts showing retry timing upon determining power supply fluctuations during determination and clearing write disable.

DETAILED DESCRIPTION OF THE PREFERRED EMBODIMENTS

Figure 1:
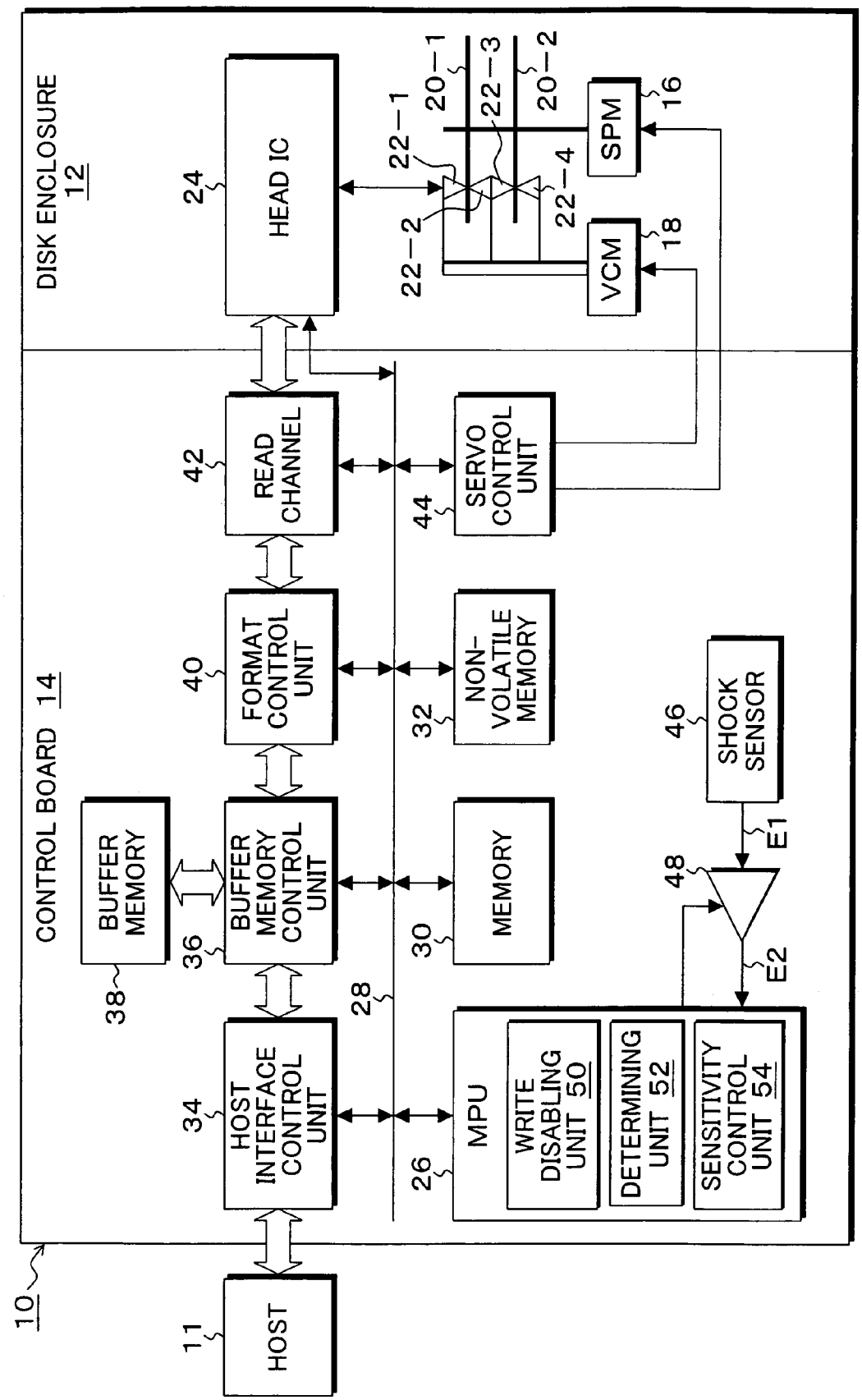
FIG. 1 is a block diagram of a magnetic disk apparatus showing one embodiment of a storage apparatus according to the present invention.

FIG. 1 is a block diagram of a magnetic disk apparatus as one embodiment of a storage apparatus according to the present invention. In FIG. 1, a magnetic disk apparatus 10 known as a hard disk drive (HDD) is constituted of a disk enclosure 12 and a control board 14. The disk enclosure 12 is provided with a spindle motor 16, and disk media (storage media) 20-1 and 20-2 are mounted on the rotational axis of the spindle motor 16 and rotated at a constant speed. The disk enclosure 12 is provided with a voice coil motor 18, and the voice coil motor 18 mounts heads 22-1 to 22-4 on a tip of an arm of a head actuator to position the head relative to a recording face of the disk media 20-1 and 20-2. A write head and a read head are integrally mounted on the heads 22-1 to 22-4. The heads 22-1 to 22-4 are connected to a head IC 24 through a signal line, and the head IC 24 selects one head by a head select signal based on a write command or read command from a host 11 as a higher-level apparatus to perform writing or reading. Further, the head IC 24 is provided with a write amplifier for write system and a preamplifier for read system. The control board 14 is provided with a MPU 26, and a bus 28 of the MPU 26 is provided with a memory 30 for storing therein a control program and control data using a RAM and a non-volatile memory 32 for storing therein a control program using a FROM or the like. The bus 28 of the MPU 26 is provided with a host interface control unit 34, a buffer memory control unit 36 for controlling a buffer memory 38, a format control unit 40 functioning as a hard disk controller, a read channel 42 functioning as a write modulating unit and a read demodulating unit, and a servo control unit 44 for controlling the voice coil motor 18 and the spindle motor 16. The magnetic disk apparatus 10 performs writing processing and reading processing based on input/output commands for the host 11. Here, the normal operation in the magnetic disk apparatus will be explained as follows. When the host interface control unit 34 receives a write command and write data from the host 11, it decrypts the write command in the MPU 26 and stores the received write data in the buffer memory 38 as needed, and thereafter converts it to a predetermined data format in the format control unit 40, adds an ECC code by the ECC processing, and performs scrambling, RLL code converting and write compensating in the write modulating system in the read channel 42 and then writes it on the disk medium 20-1, for example, from the write head of the head 22-1 selected through the head IC 24 from the write driver. At this time, a head positioning signal is given to the servo control unit 44 using DSP or the like from the MPU 26, and the voice coil motor 18 seeks the head to a target track instructed by the command to perform on-track and track following control. On the other hand, when the host interface control unit 34 receives a read command from the host 11, it decrypts the read command in the MPU 26 and amplifies a read signal read out from the read head selected by the head select of the head IC 24 and amplified by the read amplifier, and then inputs it in the read demodulating system of the read channel 42 and demodulates the read data by partial response maximum likelihood detection (PRML) or the like to detect and correct an error by performing the ECC processing in the format control unit 40, and thereafter buffers it to the buffer memory 38 and transfers the read data from the host interface control unit 34 to the host 11. In addition to the above-described structure of the magnetic disk apparatus 10, in the present invention, a shock sensor 46 is further provided on the control board 14 side. As the shock sensor 46, a piezoelectric element is used, for example. When a shock is applied to the host 11 having incorporated therein the magnetic disk apparatus 10, the shock sensor outputs a shock sensor signal E1 in accordance with this shock. The output of the shock sensor 46 is input to an amplifier 48, is amplified with a gain set in the amplifier 48, and is then read into the MPU 26 as a shock sensor signal E2. The amplifier 48 can change the gain under the control of the MPU 26. With the gain of the amplifier 48 being changed, the detection sensitivity of the shock sensor 46 can be changed. Here, the shock sensor 46 is disposed so as to detect vibrations in a direction orthogonal to the arm of the head actuator supporting at its tip the heads 22-1 to 22-4. With the provision of the shock sensor 46, the MPU 26 is provided with a write disabling unit 50, a determining unit 52, and a sensitivity control unit 54. When the shock sensor signal E2 based on the output of the shock sensor 46 is obtained through the amplifier 48, the write disabling unit 50 disables writing by a head on a disk medium over a predetermined time T corresponding to a shock convergence. In the present embodiment, simultaneously with determining the shock sensor signal E2 from the shock sensor 46 and causing the write disabling unit 50 to perform a disabling operation, writing is disabled by the write disabling unit 50 over the predetermined time T, which is equal to that at the time of shock detection, also when a normal write fault occurs during the execution of a write command from the host 11. In this manner, by allowing commonality of the function of the write disabling unit 50 between the case of shock detection and the case of a write fault that might normally occur for a write command, the structure of a program or firmware for achieving the function of the write disabling unit 50 in the MPU 26 can be simplified. While the write disabling operation of the write disabling unit 50 based on the shock sensor E2 is being performed, the determining unit 52 determines whether an output of the shock sensor is a detection output of the shock sensor 46 due to a shock or an erroneous detection output of the shock sensor 46 due to power supply fluctuations. That is, when a shock is applied, the shock sensor 46 provided in the magnetic disk apparatus 10 causes the shock sensor signal E2 to be output from the amplifier 48. Simultaneously, for example, when a power supply voltage Vcc to be supplied to the magnetic disk apparatus 10, for example, Vcc=5 volts, is fluctuated at the time of a writing operation of the apparatus, the shock sensor output of the shock sensor 46 is also fluctuated in accordance with these power supply fluctuations. With the shock sensor signal E2 amplified by the amplifier 48 exceeding a threshold level Eth for determining that the output is due to a shock, power supply fluctuations may be erroneously detected as a shock. To avoid the above, in the present invention, when writing is disabled at the write disabling unit 50 based on the shock detection signal of the shock sensor 46 determined by the determining unit 52, the determining unit 52 determines whether the shock detection signal represents a detection output of the shock sensor 46 due to a shock or an erroneous detection output of the shock sensor 46 due to power supply fluctuations. The determination process at the determining unit 52 includes the following three determinations.

(1) A first determination process for determining, from a position signal of the head, whether the output of the shock sensor 46 is an output due to a shock or an output due to power supply fluctuations.

(2) A second determination process for determining, by monitoring decreasing fluctuations of a power supply voltage with respect to a rated voltage, whether the output of the shock sensor 46 is an output due to a shock or an output due to power supply fluctuations.

(3) A third determination process for determining, from an output behavior of the shock sensor 46, whether the output of the shock sensor 46 is an output due to a shock or an output due to power supply fluctuations. Here, in the determination of the position signal of the head to be performed as the first determination process, when a shock is applied, it is determined that the position signal is fluctuated, and in the case of power supply fluctuations, it is determined that the position signal is not fluctuated.

FIGS. 2A to 2E are time charts of a power supply voltage, a shock sensor signal, a shock detection signal, a write disable signal, and a head position signal when shock is applied to the magnetic disk apparatus 10 of FIG. 1. The power supply voltage Vcc shown in FIG. 2A is a constant power supply voltage 56 in which, basically, Vcc=5 volts when a shock is applied, and is never below a threshold voltage Vth set at a lower side of 5 volts.

FIG. 2B shows an output signal of the shock sensor 46, specifically, the shock sensor signal E2 from the amplifier 48 of FIG. 1. In this example, two shocks are applied at intervals, and a shock sensor signal 58-1 and a shock sensor signal 58-2 are obtained.

FIG. 2C shows a shock detection signal, and shock detection signals 60-1 and 60-2 are obtained at timing when the voltage exceeds a threshold voltage Eth set for the shock sensor signal E2 of FIG. 2B. Write disable signals 62-1 and 62-2 of FIG. 2D occur in synchronization with a rising edge of the shock detection signals 60-1 and 60-2, and are output for the predetermined time T defined corresponding to a shock convergence time. A write disable period is determined by measuring or estimating a shock convergence time in advance before product shipment, and of the order of several milliseconds.

FIG. 2E shows a head position signal. Head position signals 64-1 and 64-2 are significantly fluctuated in accordance of the shocks at timing corresponding to the shock sensor signal 58-1 and 58-2. Therefore, as the first determination process at the determining unit 52 of FIG. 1, the head position signal as shown in FIG. 2E is checked when a shock detection signal is obtained. When the head position signal is fluctuated, it can be determined that the output is due to a shock. When the head position signal is not fluctuated, it can be determined that the output is due to power supply fluctuations. Next, in a determination process by monitoring the power supply voltage as the second determination process at the determining unit 52, fluctuations in power supply voltage below the threshold voltage Vth set lower than the rated power supply voltage Vcc=5 volts are monitored. If fluctuations in power supply voltage below the threshold voltage Vth are observed, it is determined that the output is an output of the shock sensor 46 due to power supply fluctuations. If fluctuations in power supply voltage are not below the threshold voltage Vth, it is determined that the output is an output of the shock sensor 46 due to a shock.

FIGS. 3A to 3E are time charts of a power supply voltage, a shock sensor signal, a shock detection signal, a write disable signal, and a head position signal when the power supply voltage is fluctuated in the magnetic disk apparatus 10 of FIG. 1. FIG. 3A shows fluctuations in power supply voltage Vcc, for example, fluctuations when a ripple voltage is applied. For such fluctuations in power supply voltage Vcc, the shock sensor signal E2 obtained through the amplifier 48 of the shock sensor 46 are fluctuated as shown in FIG. 3B in accordance with fluctuations in power supply voltage 56. Shock detection signals 60-1, 60-2, and 60-3 of FIG. 3C are output at timing of exceeding the threshold Eth for shock detection. Therefore, as shown in FIG. 3D, in synchronization of a rising edge of each of the shock detection signals 60-1, 60-2, and 60-3, write disable signals 62-1, 62-2, and 62-3 are output for the predetermined period T, thereby disabling writing. In this case, no shock is applied, and therefore a head position signal 64 of FIG. 3E is a stable head position signal with micro-fluctuations associated with an on-track control over a target track.

In the second determination process at the determining unit 52 of FIG. 1, fluctuations in power supply voltage Vcc as shown in FIG. 3A are monitored, and when it is determined that power supply fluctuations below the threshold voltage Vth set lower than the rated voltage Vcc=5 volts are observed, it is determined that the output is an erroneous detection output of the shock sensor 46 due to power supply fluctuations. When fluctuations in power supply voltage Vcc lower than the threshold voltage Vth are not observed, it is determined that the output is an output of the shock sensor 46 due to a shock.

In the third determination process at the determining unit 52 of FIG. 1, it is determined, from a behavior of an output of the shock sensor 46 during write disable, whether the output is an output due to vibrations or an output due to power supply fluctuations. In this determination of a behavior of an output of the shock sensor 46, the output signal of the shock sensor 46 is integrated over a defined period, and when the integration value is linearly changed, it is determined that the output is an output due to power supply fluctuations, and when the integration value is non-linearly changed, it is determined that the output is an output due to a shock.

Figure 4A:
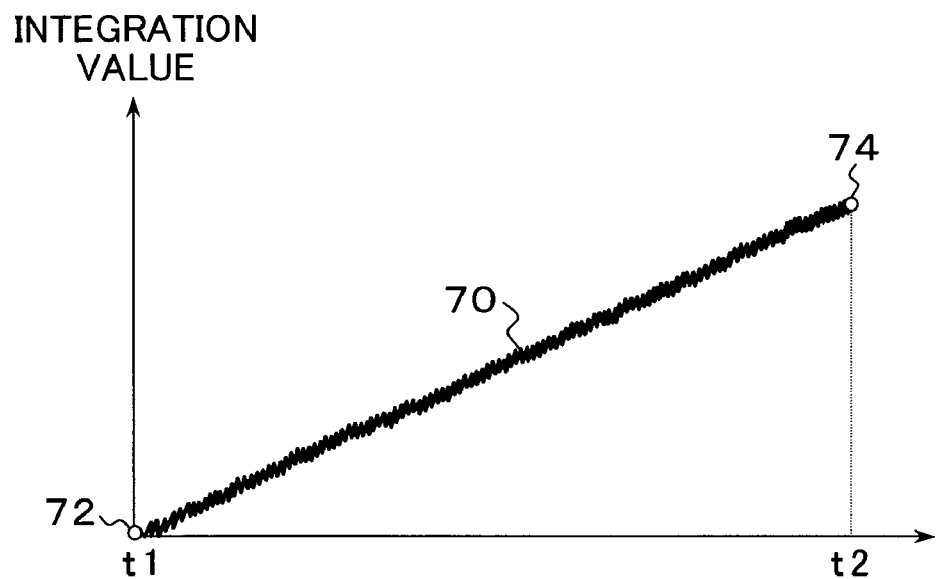
FIGS. 4A and 4B are drawings for describing power supply fluctuation control for generating a pseudo writing operation state.
Figure 4B:
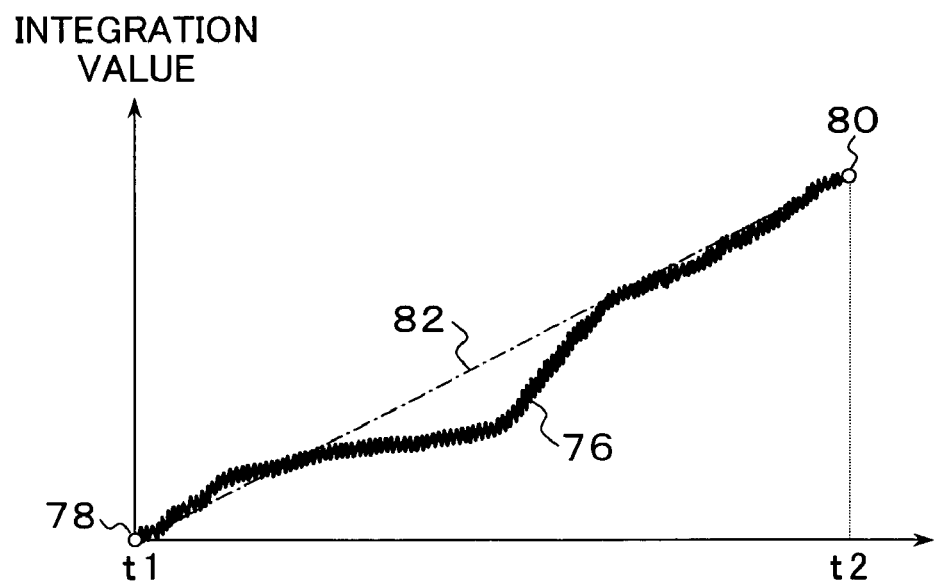

FIG. 4A depicts changes with time in integration value of the output of the shock sensor 46 when the power supply voltage is fluctuated, and FIG. 4B depicts changes with time in integration value of the output of the shock sensor 46 when a shock is applied. As for power supply fluctuations in FIG. 4A, in integration of the shock sensor output from a time t1 to a time t2, fluctuations in power supply voltage are, for example, mild fluctuations with a constant period due to superposition of a ripple voltage as shown in FIG. 3A. Therefore, the integration value of the output of the shock sensor 46 are approximately linearly increased from the time t1 to the time t2 as shown in an integration characteristic 70.

On the other hand, as for an integration characteristic 82 of the output of the shock sensor 46 when a shock is applied in FIG. 4B, the output of the sensor output due to a shock is abrupt and non-periodic as shown in FIG. 2B. Thus, the integration value represented by an integration characteristic 76 increased non-linearly with respect to time. Therefore, if the integration characteristic 70 as shown in FIG. 4A in which the integration value is linearly increased is obtained, it can be determined that the output is an output of the shock sensor 46 due to power supply fluctuations, and if the integration characteristic 76 as shown in FIG. 4B in which the integration value is non-linearly increased is obtained, it can be determined that the output is an output of the shock sensor 46 due to a shock. A specific determination in the integration characteristics 70 and 76 is performed in the following manner. As for power supply fluctuations in FIG. 4A, a straight line connecting an initial value at an integration start point 72 at a time t0 and an integration value at an integration end point 74 at the time t2 is set, and a total sum $\Sigma\Delta S$ of absolute values of differences of the integration characteristic 70 with respect to this straight line is found. If this difference total sum $\Sigma\Delta S$ is 0 or not larger than a predetermined threshold value TH close to 0, the integration value is changed linearly as represented by the integration characteristic 70, thereby determining that the output is an erroneous detection output due to power supply fluctuations. Also, as for the case depicted in FIG. 4B where a shock is applied, a straight line 82 connecting an initial value at an integration start point 78 at the time t1 and an integration value at an integration end point 80 at the time t2 is set, and a total sum ΣΔS of absolute values of actually-calculated differences of the integration characteristic 76 with respect to the straight line 82 is found in a similar manner. If this difference total sum ΣΔS is 0 or exceeds the predetermined threshold value TH set to be close to 0, it is determined that the output is an output of the shock sensor 46 due to a shock. Here, as an integration time, a predetermined integration time can be set so as to cover a time period from a time when a shock is applied to a time when the shock is converged. Normally, the time period from the time when a shock is applied to the time when the shock is converged is an extremely short time period not longer than several milliseconds. Such a shock time is an extremely short time period compared with a time period of power supply fluctuations, and a shock provides abrupt fluctuations during the shock time. However, the power supply voltage is fluctuated at an approximately constant ratio and, as a result, changes represented by the linear integration characteristic 70 as shown in FIG. 4A occur. On the other hand, as for vibration, changes represented by the non-linear integration characteristic 76 as shown in FIG. 4B occur. Here, the integration time is a time for one rotation (one cycle) of a disk, and the determination time is one cycle plus a time for decision.

Furthermore, the determining unit 52 of FIG. 1 generates a pseudo writing operation state corresponding to a writing operation in the magnetic disk apparatus 10 during the determination process in conjunction with write disable. For generation of this pseudo writing operation state, processing is performed such that:

(1) the detection sensitivity of the shock sensor 46 is increased, and (2) the power supply voltage is forcefully fluctuated in a range not smaller than the rated voltage Vcc=5 volts.

A reason for generating a pseudo writing operation state during determination is as follows. During the determination process in conjunction with write disable when the shock detection signal of the shock sensor 46 is obtained, the output of the shock sensor 46 has not yet been determined as an output due to a shock or an output due to power supply fluctuations, and the optimal sensitivity of the shock sensor 46 has not yet been set. Therefore, a writing operation has to be disabled. Here, power supply fluctuations when a writing operation is actually performed are larger than those at the time of non-writing. Therefore, since writing is disabled during the determination process, power supply fluctuations are smaller compared with those at the time of actual writing. Thus, in the case where a shock erroneous detection from the detection output of the shock sensor 46 occurs due to power supply fluctuations at the time of an actual writing operation because of variations in the shock sensor 46, an accurate determination might not be possible in the determination process. To get around this, in the present invention, a pseudo writing operation state similar to an actual writing operation is generated in the determination process performed in a write disable state for performing the determination process. Here, variations in the shock sensor 46 are those in PSRR (Power Supply Rejection Ratio) representing a ratio of increase and decrease in offset voltage with respect to voltage supply fluctuations. With these variations in PSSR, a state occurs in which an erroneous detection may or may not occur in the shock sensor 46 due to power supply fluctuations at the time of an actual writing operation. The sensitivity of the shock sensor 46 when a pseudo writing operation is generation is put up by putting the gain of the amplifier 48 provided next to the shock sensor 46 from an initially default gain G0 by a predetermined certain gain ΔG. Also, forceful power supply fluctuations for generating a pseudo writing operation state can be achieved by periodically turning ON/OFF a circuit that becomes active at the time of an actual writing operation. For example, a preamplifier incorporated in the head IC 24 provided at the disk enclosure 12 side of FIG. 1 for supplying a write signal to the head or a circuit for transmitting data to a preamplifier for the head IC 24 incorporated in the read channel 42 are forcefully turned ON/OFF.

Figure 5:
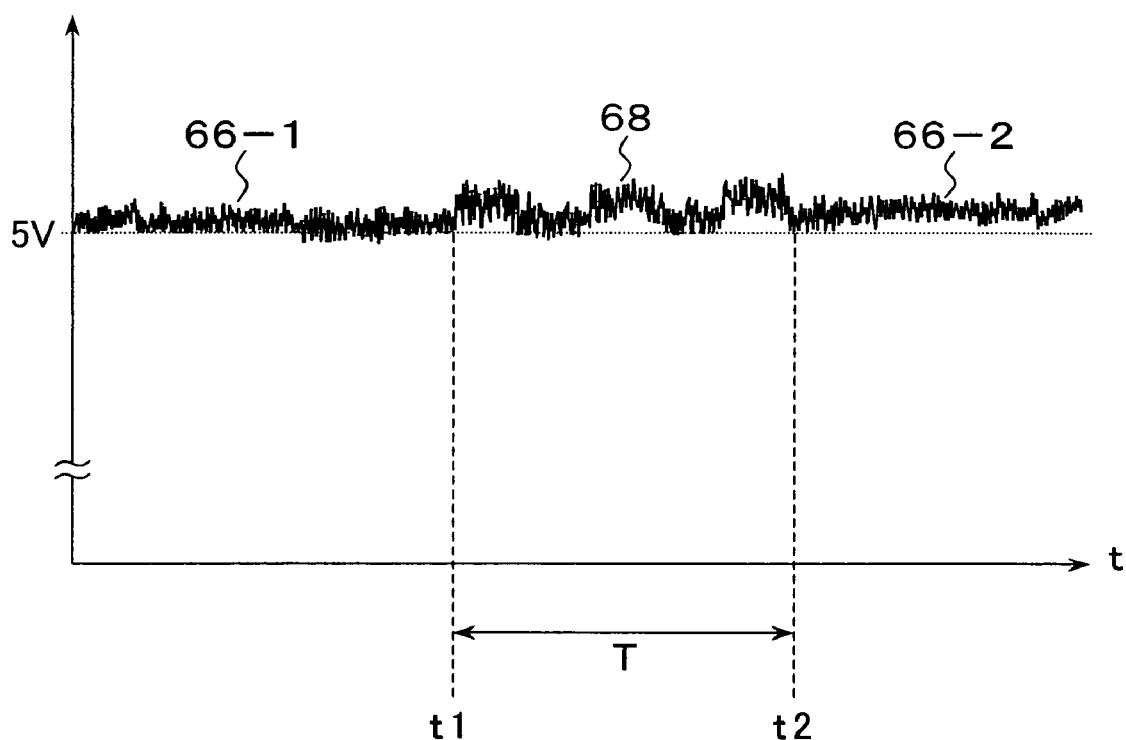
FIG. 5 is a drawing for describing integration changes of a shock sensor output at the time of power supply fluctuations and shock application.

FIG. 5 is a drawing for describing power supply voltage waves when the power supply voltage is forcefully fluctuated in a range not smaller than the rated voltage Vcc=5 volts for generating a pseudo writing operation state over the determination time T, that is, the write disable time T. In FIG. 5, a voltage wave 66-1 until the time t1 is in a normal state. Over a T1 time from the time t1 to the time t2, the preamplifier, the data transmission circuit for the write head, or the like is forcefully turned ON/OFF to generate a voltage fluctuation wave 68 in a range not smaller than the rated voltage Vcc=5 volts.

In this manner, with a pseudo writing operation state being generated during determination by putting up the sensitivity of the shock sensor 46 and generating forceful fluctuations in power supply voltage, the determination process by the determining unit 52, more specifically, the determination process as the second determination process based on the power supply voltage and the intensity determination with integration value of the output of the shock sensor 46 as the third determination process, is performed under the conditions equivalent to those during an actual writing operation, thereby making it possible to more accurately determine whether the output of the shock sensor 46 is due to a shock or power supply fluctuations.

Referring again to FIG. 1, the sensitivity control unit 54 provided in the MPU 26 increases the detection sensitivity of the shock sensor when the determining unit 52 determines that the output is a detection output of the shock sensor 46 due to a shock and, conversely, decreases the detection sensitivity of the shock sensor 46 when it is determined that that the output represents an erroneous detection due to power supply fluctuations. Furthermore, when it is determined that the output represents an erroneous detection of the shock sensor 46 due to power supply fluctuations, the sensitivity control unit 54 forcefully clears the write disable over the predetermined time T by the write disabling unit 50 at the time of determining the erroneous detection due to power supply fluctuations. Control of the detection sensitivity of the shock sensor 46 by the sensitivity control unit 54 is performed by putting up or down the gain with respect to the amplifier 48. The gain control of the amplifier 48 is set at the default gain G0 in an initial state. By putting up the detection sensitivity for setting a pseudo writing operation state in the determining unit 52, a gain G becomes G=G0+ΔG with one step up from the default gain G. Based on the determination result thereafter, control of the gain of the amplifier 48 is performed by the sensitivity control unit 54. That is, when the determining unit 52 determines that the output is a detection output due to a shock, the current gain G of the amplifier is set as G+ΔG. This gain-up is performed until the gain reaches a maximum gain Gmax. On the other hand, when the determining unit 52 determines that the output is an erroneous detection due to power supply fluctuations, gain-down is performed so that G=G−ΔG. This gain-down is repeatedly performed until the gain reaches a minimum gain Gmin. Furthermore, when the determining unit 52 determines that the output is an erroneous output due to power supply fluctuations, the sensitivity control unit 54 decreases the detection sensitivity of the shock sensor 46 and, simultaneously, clears the write disable by the write disabling unit 50. By clearing the write disable upon determination of an erroneous detection of the shock sensor 46 due to power supply fluctuations, it is possible to prevent deterioration in retry capability when the function of the write disabling unit 50 is used in common in the case of shock detection by the shock sensor 46 and in the case of a write fault in a normal write process.

FIGS. 6A to 6D are time charts of an index signal of the magnetic disk, a shock detection signal, a write disable signal, and a write gate signal when the shock sensor 46 detects and determines a shock. When a shock detection signal 60 of FIG. 6B is obtained, in synchronization with the rising edge, a write disable signal 62 of FIG. 6C occurs over a predetermined time T. When a write gate signal of FIG. 6D becomes effective before the shock detection signal 62 is obtained and a writing operation is then being performed, a write disable signal occurs upon shock detection, thereby turning off a write gate signal 86-1 and disabling writing. Here, a write disable signal 62 is present for a time of approximately 1.5 rotations of the medium when viewed from the index signal of FIG. 6A, and a retry of a write command with writing being disabled upon shock detection is performed with a write gate signal 86-3 during rotation from an index signal 84-3 after the write disable signal disappears. Here, when the write gate signal 86-1 is turned off in the course of one rotation based on a first index signal 84-1 to cause a write fault to occur, if no write disable signal is present, a retry is supposed to be performed at the timing of a write gate signal 86-2 after rotational latency until the next index signal 84-2. However, for a determination process over the T time, a retry is delayed until the timing of the write gate signal 86-3. Such a delay in retry timing due to the presence of the write disable signal over the T time as shown in FIGS. 6A to 6D does not depend on the detection signal of the shock sensor 46, and also occurs when a write fault occurs because of some reason during a normal execution of a write command. Since the write disable signal is present over the T time, a retry in response to the write fault is performed not at the timing of the write gate signal 86-2 when a determination process is not performed, but is delayed until the timing of the write gate signal 86-3, which is after one more rotation. As for write disabling and determination processing based on a write fault, since it is assumed that no vibration is applied, power supply fluctuations are supposed to be determined. In particular, in the determination process by the determining unit 52 according to the present invention, it is first determined from fluctuations of the head position signal whether the output is due to power supply fluctuations or due to a shock. Therefore, if it is determined in the initial determination process based on the head position signal that the output is not due to vibrations, it is determined that the output is due to power supply fluctuations, and the second determination process and the third determination process are skipped. Therefore, in the present invention, when it is determined during the determination process that the output is an erroneous detection output of the shock sensor due to power supply fluctuations, write disable is immediately cleared.

FIGS. 7A to 7D are time charts when it is determined during determination that the output represents an erroneous detection of the shock sensor 46 due to power supply fluctuations. As shown in FIG. 7D, the write gate signal 86-1 occurs during one rotation with reference to the index signal 84-1 and a writing operation is performed. During this writing operation, a write fault occurs because of some reason, and a write disable signal of FIG. 7C is present over a predetermined time T. Simultaneously, a determination process 88 has started and, in this case, since it is not due to a shock but due to a write fault, it is determined, from fluctuations of the head position signal in the determination process as the first determination process, that the output represents an erroneous detection not due to a shock but due to power supply fluctuations (actual vibrations are not detected but this erroneous detection merely represents a determination result). At the time of obtaining this determination result, the write disable signal is cleared, thereby causing the write gate signal 86-2 to be output during the rotation from the next index signal 84-2 for executing a retry in response to the write fault. In this manner, in the present invention, even when the write disabling unit 50 is used in common in the case of shock detection by the shock sensor 46 and in the case of a write fault associated with the execution of a write command, without receiving an influence from a determination process of determining whether the output of the shock sensor 46 is due to a shock or due to power supply fluctuations, a retry can be performed in response to a normal write fault associated with the execution of a write command at the timing of one rotational latency, thereby preventing deterioration in access capability.

Figure 8:
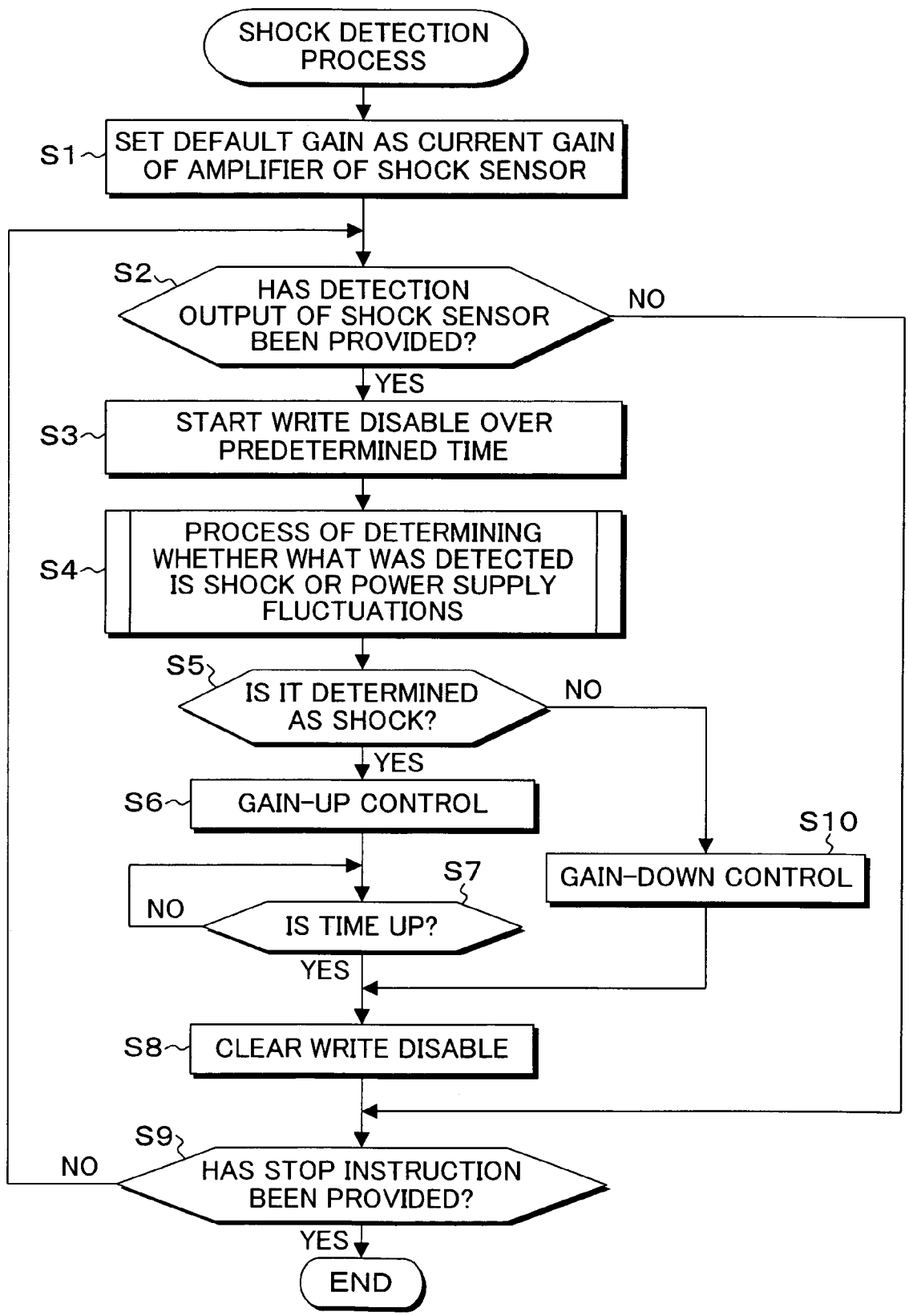
FIG. 8 is a flowchart of a control process associated with shock detection according to an embodiment of FIG. 1.

FIG. 8 is a flowchart of a control process of the magnetic disk apparatus 10 associated with shock detection according to the embodiment of FIG. 1. In FIG. 8, in step S1, the default gain G0 is set as the current gain of the amplifier 48 provided for the shock sensor 46. Then in step S2, it is checked whether a detection output of the shock sensor 46 has been provided. Specifically, the shock sensor signal E2 from the amplifier 48 is read and compared with the predetermined threshold Eth, and if it is not smaller than the threshold Eth, it is determined that a detection output of the shock sensor has been provided. If it is determined that a detection output of the shock sensor has been provided, write disable is started in step S3 over a predetermined period T. Then in step S4, a determination process is performed by the determining unit 52 to determine whether what was detected is a shock or power supply fluctuations. When it is determined in step S5 from the determination result of the determining unit 50 that what was detected is a shock, the procedure goes to step S6, wherein a control is performed for putting up the gain of the amplifier 48 in order to increase the sensitivity of the shock sensor 46. When it is determined in step S7 that time is up for the predetermined time T, write disable is cleared in step S8. On the other hand, when it is determined in step S5 that what was detected is not a shock, that is, when it is determined that what was detected is a erroneous detection due to power supply fluctuations, the procedure goes to step S10, wherein a control is performed for putting down the gain of the amplifier 48 in order to decrease the detection sensitivity of the shock sensor 46 and, in this case, write disable is immediately cleared in step S8. Such processes in steps S2 to S8 are repeated until a stop instruction is provided in step S9.

Figure 9:
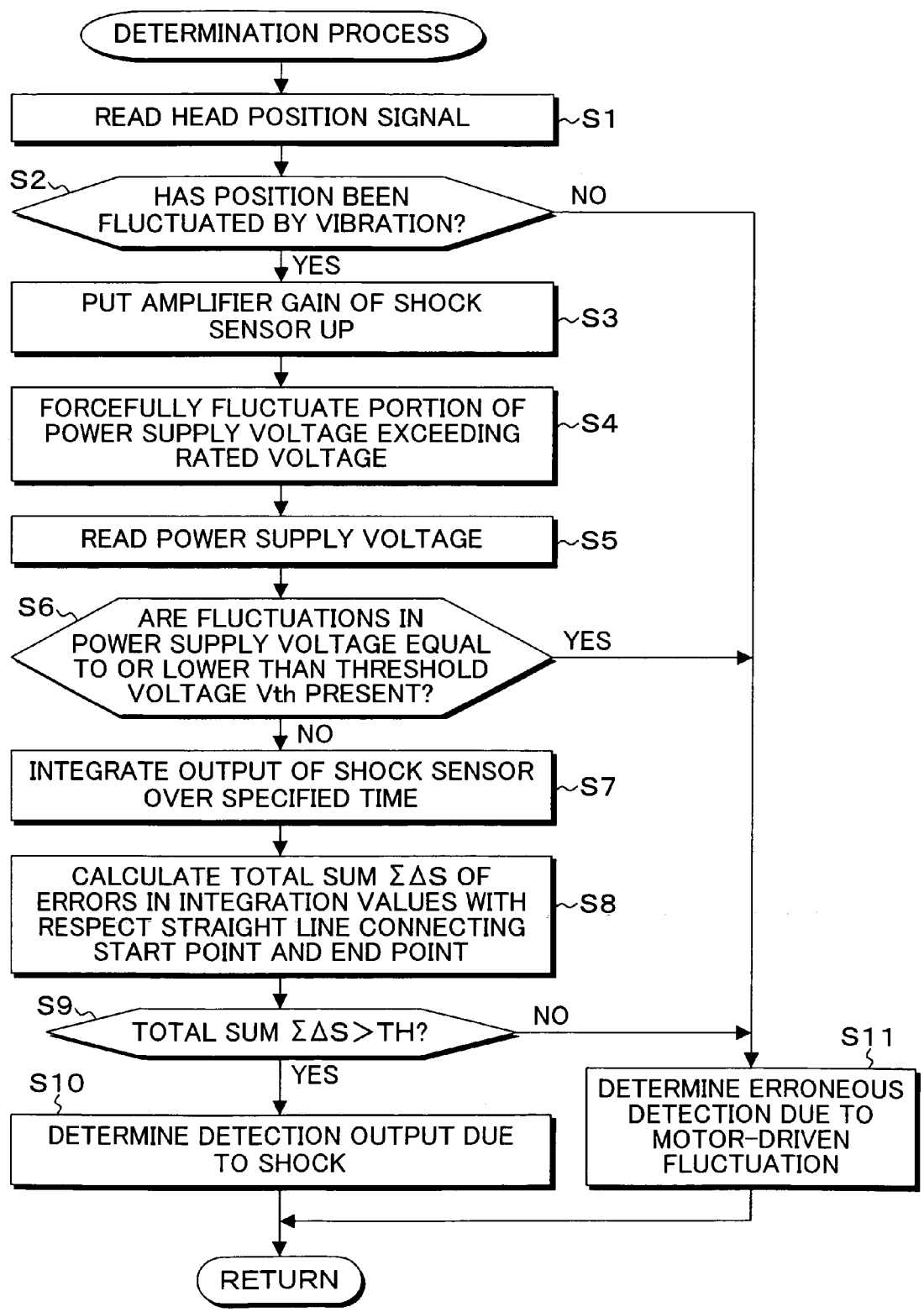
FIG. 9 is a flowchart of a determination process in step S4 of FIG. 8.

FIG. 9 is a flowchart of the determination process in step S4 of FIG. 8. In FIG. 9, in the determination process, the head position signal is first read in step S1. In step S2, it is checked whether the head position signal represents positional fluctuations due to a shock. If the head position signal does not represents positional fluctuations due to a shock, the procedure immediately goes to step S11, wherein it is determined that the output is an erroneous detection due to power supply fluctuations. When it is determined in step S2 that the head position signal represents positional fluctuations due to a shock, the procedure goes to step S3, wherein the gain of the amplifier 48 provided for the shock sensor 46 is put up. Then in step S4, a portion of the power supply voltage exceeding the rated voltage is forcefully fluctuated. With these steps S3 and S4, a pseudo writing operation state during determination is generated. Then in step S5, the power supply voltage is read. In step S6, it is determined whether fluctuations in power supply voltage equal to or lower than the threshold voltage Vth are present. If fluctuations equal to or lower than the threshold voltage Vth are present, the procedure goes to step S11, wherein it is determined that the output represents an erroneous detection due to power supply fluctuations. If it is determined in step S6 that fluctuations equal to or lower than the threshold voltage Vth are not present, the output of the shock sensor 46 is integrated over a specified time in step S7. In step S8, a total sum $\Sigma \Delta S$ of errors (absolute values) in integration values with respect to a straight line connecting an integration start point and an integration end point is calculated. Then in step S9, it is checked whether the calculated total sum $\Sigma \Delta S$ exceeds a preset threshold equal to 0 or close thereto. If it exceeds the threshold TH as shown in FIG. 4B, the procedure goes to step S10, wherein it is determined that the output is a detection output due to a shock. On the other hand, if it is determined in step S9 that the total sum $\Sigma \Delta S$ is not larger than the threshold, the case is as shown in FIG. 4A where the output is due to power supply fluctuations. Therefore, the procedure goes to step S11, wherein it is determined that the output represents an erroneous detection due to power supply fluctuations.

Figure 10:
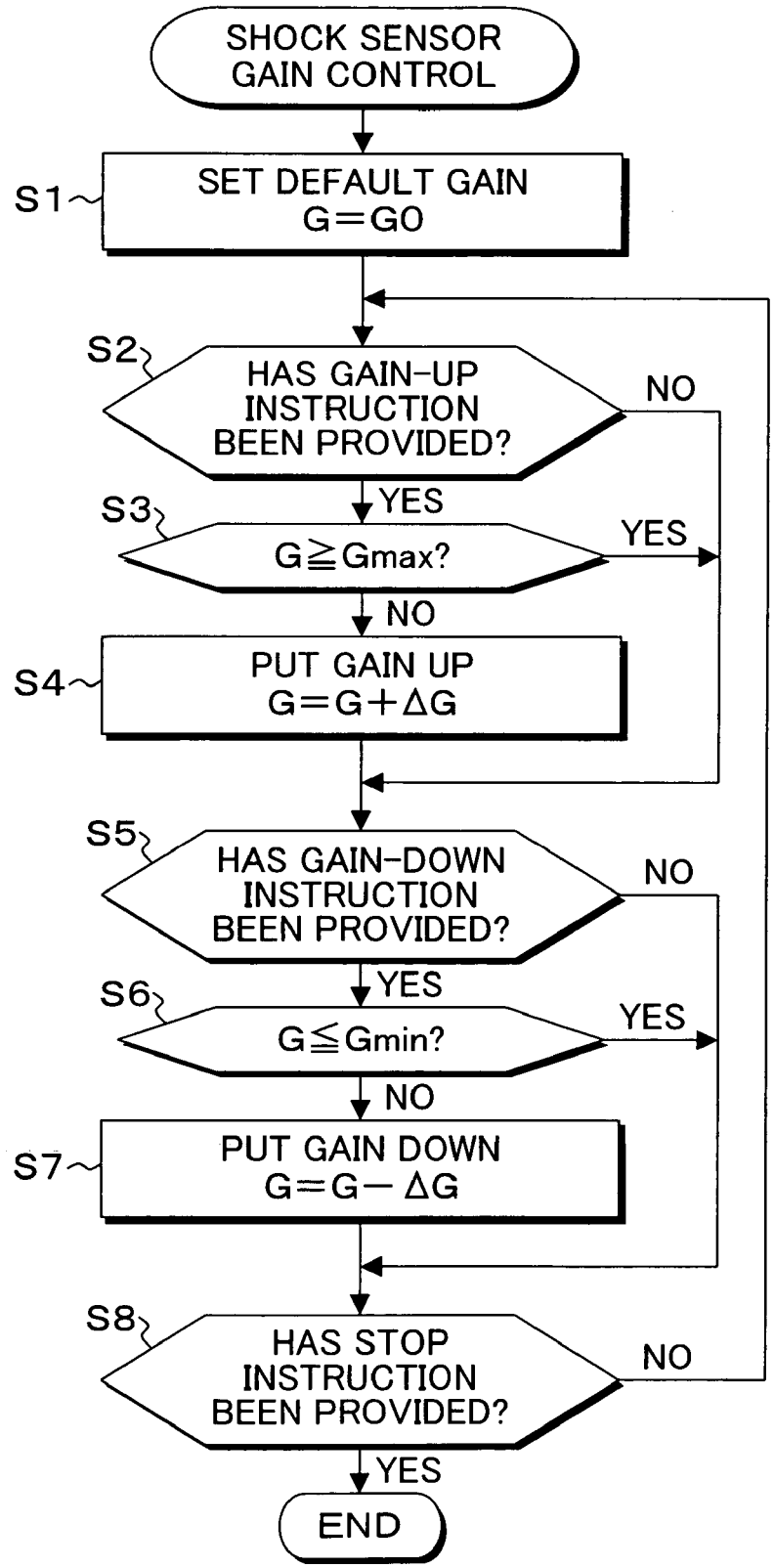
FIG. 10 is a flowchart of a shock sensor gain control according to the embodiment of FIG. 1.

FIG. 10 is a flowchart of a shock sensor gain control according to the embodiment of FIG. 1. In the FIG. 10, in the shock sensor gain control, after an initial setting is performed in step S1 wherein the current gain G is set as a default gain G0, if it is determined in step S2 that a gain-up instruction has been provided, under the condition determined in step S3 that the gain is smaller than the maximum gain Gmax, the gain is put up in step S4. If it is determined in step S5 that a gain-down instruction has been provided, under the condition determined in step S6 that the gain is not larger than the minimum gain Gmin, the procedure goes to step S7, wherein the gain is put down. This gain control in steps S2 to S7 is repeated until a stop instruction is provided in step S8.

Figure 11:
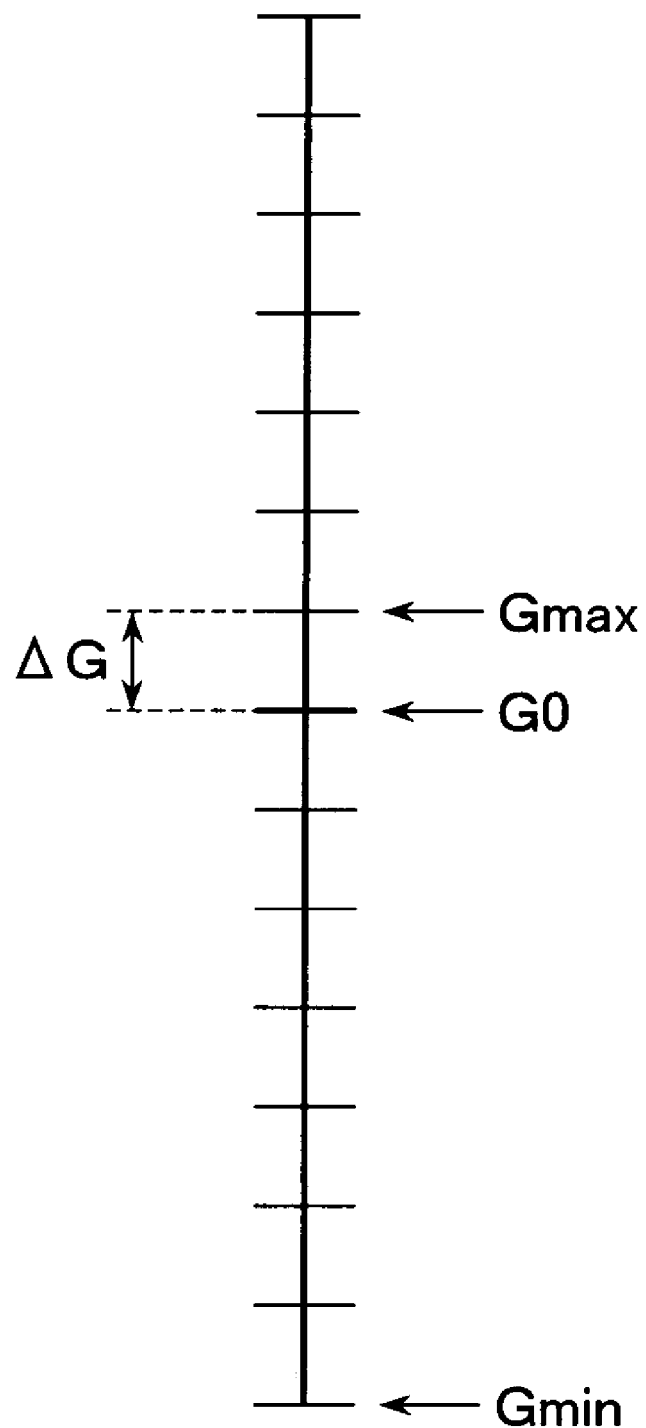
FIG. 11 is a drawing of a gain range controlled based on FIG. 10.

FIG. 11 is a drawing of each gain in the shock sensor gain control of FIG. 10. For example, in FIG. 11, a gain adjustment range is divided into fourteen stages, and each gain stage represents $\Delta G$. The default gain G0 is set approximately in the middle. In the present invention, at the time of a first shock detection or a first determination process associated with a write fault, in order to generate a pseudo writing operation state, the gain is put up from the default gain G0 by $\Delta G$. At this stage, the current gain G is G=G0+$\Delta G$. Also, in the present embodiment, a gain increased by one step from the default gain G0 is set as the maximum gain Gmax. Therefore, when a determination process is performed once, the gain G reaches the maximum gain Gmax. In this state, a determination process is performed, and if it is determined that the output of the shock sensor 46 represents an erroneous detection due to power supply fluctuations, the current gain G=G0+G=Gmax is put down by one step $\Delta G$, and returns to G=G0. On the other hand, if it is determined that the output is a detection output due to a shock, the gain is put up. In this case, however, the gain has reached the maximum gain Gmax, the current gain G is kept at G=Gmax. Then, when it is determined in a second determination process due to a shock or associated with a write fault that the output represents an erroneous detection due to power supply fluctuations, the gain is put down to cause the current gain G to be G=G0-$\Delta G$. Then, it is subsequently determined that the output represents an erroneous detection due to power supply fluctuations, the gain is put down by $\Delta G$ in succession, and the gain control will stop at the minimum value Gmin. As a matter of course, the maximum gain Gmax and the minimum gain Gmin with respect to the default gain G0 can be appropriately set as required. Furthermore, the present invention provides a program to be executed at the MPU 26 provided in the magnetic disk apparatus 10, that is, a computer, of FIG. 1, and this program has contents represented by the flowcharts shown in FIGS. 8 to 10. Still further, although the above embodiment takes a magnetic disk apparatus as an example of the recording apparatus, the present invention is not restricted to the above, and can be directly applied to a recording apparatus as long as it is a storage apparatus having a structure using a disk medium and a head. Still further, the present invention includes appropriate modifications without impairing its objects and advantages, and is also not restricted by numerical values shown in the above embodiment.

What is claimed is:

1. A storage apparatus comprising:
a shock sensor that detects a shock applied to the apparatus for output;
a write disabling unit that disables, when a detection signal of the shock sensor is obtained, writing by a head on a medium over a predetermined time corresponding to a shock convergence;
a determining unit that determines, during the write disable, whether an output of the shock sensor is a detection output of the shock sensor due to a shock or an erroneous detection output of the shock sensor due to power supply fluctuations; and
a sensitivity control unit that increases a detection sensitivity of the shock sensor when the determining unit determines that the output is a detection output due to the shock, and decreases the detection sensitivity of the shock sensor and clears the write disable when the determining unit determines that the output is an erroneous detection output due to power supply fluctuations.

2. The storage apparatus according to claim 1, wherein the determining unit includes:
a first determining unit that determines, from a position signal of the head, whether the output of the shock sensor is an output due to a shock or an output due to power supply fluctuations;
a second determining unit that determines, by monitoring decreasing fluctuations of a power supply voltage with respect to a rated voltage, whether the output of the shock sensor is an output due to a shock or an output due to power supply fluctuations;
a third determining unit that determines, from an output behavior of the shock sensor, whether the output of the shock sensor is an output due to a shock or an output due to power supply fluctuations; and
a determination output unit that supplies, as a determination result, an output indicative of power supply fluctuations when at least any one of the first to third determining units determines that the output is an output due to power supply fluctuations, and supplies, as a determination result, an output indicative of an output due to a shock when all of the first to third determining units determine that the output is an output due to a shock.

3. The storage apparatus according to claim 2, wherein the determining unit causes the detection sensitivity of the shock sensor to be increased to generate a pseudo writing operation state corresponding to a writing operation state during a determination period in write disable, and forcefully fluctuates the power supply voltage in a range not smaller than the rated voltage.

4. The storage apparatus according to claim 2, wherein the third determining unit integrates an output signal of the shock sensor over a defined period, determines that the output is an output due to power supply fluctuations when an integration value is linearly changed, and determines that the output is an output due to a shock when the integration value is non-linearly changed.

5. The storage apparatus according to claim 2, wherein the third determining unit integrates an output signal of the shock sensor over a defined period, calculates a total sum of absolute values of differences with integration values with respect to a straight line connecting an integration initial value and an integration end value, determines that the output is an output due to power supply fluctuations when the difference total sum is either one of 0 or not larger than a predetermined value, and determines that the output is an output due to a shock when the difference total sum exceeds the predetermined value.

6. The storage apparatus according to claim 1, wherein the sensitivity control unit initially sets a gain of an amplifier that amplifies the detection signal of the shock sensor as a default gain, upon reception of an instruction for putting the detection sensitivity up, increases the gain of the amplifier by a predetermined gain until the gain reaches a maximum gain, and, upon reception of an instruction for putting the detection sensitivity down, decreases the gain of the amplifier by the predetermined gain until the gain reaches a minimum gain.

7. The storage apparatus according to claim 1, wherein
the write disabling unit disables writing over the predetermined time also when a write fault associated with an execution of a write command is detected, and
the determining unit starts a determination operation in conjunction with the write disable associated with the write fault at the write disabling unit and, upon determination that the output is an output due to power supply fluctuations, immediately clears the write disable and then causes a retry in response to the write fault to be performed.

8. A storage apparatus control method comprising:
a write disabling step of disabling, when a detection signal of a shock sensor that detects a shock applied to an apparatus for output is obtained, writing by a head on a medium over a predetermined time corresponding to a shock convergence;
a determining step of determining, during the write disable, whether an output of the shock sensor is a detection output of the shock sensor due to a shock or an erroneous detection output of the shock sensor due to power supply fluctuations; and
a sensitivity control step of increasing a detection sensitivity of the sock sensor when it is determined in the determining step that the output is a detection output due to the shock, and decreasing the detection sensitivity of the shock sensor and clearing the write disable when it is determined in the determining step that the output is an erroneous detection output due to power supply fluctuations.

9. The storage apparatus control method according to claim 8, wherein the determining step includes:

a first determining step of determining, from a position signal of the head, whether the output of the shock sensor is an output due to a shock or an output due to power supply fluctuations;
a second determining step of determining, by monitoring decreasing fluctuations of a power supply voltage with respect to a rated voltage, whether the output of the shock sensor is an output due to a shock or an output due to power supply fluctuations;
a third determining step of determining, from an output behavior of the shock sensor, whether the output of the shock sensor is an output due to a shock or an output due to power supply fluctuations; and
a determination output step of supplying, as a determination result, an output indicative of power supply fluctuations when it is determined in at least any one of the first to third determining steps that the output is an output due to power supply fluctuations, and supplying, as a determination result, an output indicative of an output due to a shock when it is determined in all of the first to third determining steps that the output is an output due to a shock.

10. The storage apparatus control method according to claim 9, wherein, in the determining step, the detection sensitivity of the shock sensor is caused to be increased to generate a pseudo writing operation state corresponding to a writing operation state during a determination period in write disable, and the power supply voltage is forcefully fluctuated in a range not smaller than the rated voltage.

11. The storage apparatus control method according to claim 9, wherein, in the third determining step, an output signal of the shock sensor is integrated over a defined period, it is determined that the output is an output due to power supply fluctuations when an integration value is linearly changed, and it is determined that the output is an output due to a shock when the integration value is non-linearly changed.

12. The storage apparatus control method according to claim 9, wherein, in the third determining step, an output signal of the shock sensor is integrated over a defined period, a total sum of absolute values of differences with integration values with respect to a straight line connecting an integration initial value and an integration end value is calculated, it is determined that the output is an output due to power supply fluctuations when the difference total sum is either one of 0 and not larger than a predetermined value, and it is determined that the output is an output due to a shock when the difference total sum exceeds the predetermined value.

13. The storage apparatus control method according to claim 8, wherein, in the sensitivity control unit,
a gain of an amplifier that amplifies the detection signal of the shock sensor is initially set as a default gain, upon reception of an instruction for putting the detection sensitivity up, the gain of the amplifier is increased by a predetermined gain until the gain reaches a maximum gain, and, upon reception of an instruction for putting the detection sensitivity down, the gain of the amplifier is decreased by the predetermined gain until the gain reaches a minimum gain.

14. The storage apparatus control method according to claim 8, wherein, in the write disabling step, writing is disabled over the predetermined time also when a write fault associated with an execution of a write command is detected, and
in the determining step, a determination operation is started in conjunction with the write disable associated with the write fault at the write disabling unit and, upon determination that the output is an output due to power supply fluctuations, the write disable is then immediately cleared and a retry in response to the write fault is caused to be performed.

15. A computer-readable storage medium which stores a program causing a computer of a storage apparatus to execute steps comprising:

a write disabling step of disabling, when a detection signal of a shock sensor that detects a shock applied to an apparatus for output is obtained, writing by a head on a medium over a predetermined time corresponding to a shock convergence;

a determining step of determining, during the write disable, whether an output of the shock sensor is a detection output of the shock sensor due to a shock or an erroneous detection output of the shock sensor due to power supply fluctuations; and a sensitivity control step of increasing a detection sensitivity of the sock sensor when it is determined in the determining step that the output is a detection output due to the shock, and decreasing the detection sensitivity of the shock sensor and clearing the write disable when it is determined in the determining step that the output is an erroneous detection output due to power supply fluctuations.

16. The storage according to claim 15, wherein the determining step includes:

a first determining step of determining, from a position signal of the head, whether the output of the shock sensor is an output due to a shock or an output due to power supply fluctuations;

a second determining step of determining, by monitoring decreasing fluctuations of a power supply voltage with respect to a rated voltage, whether the output of the shock sensor is an output due to a shock or an output due to power supply fluctuations;

a third determining step of determining, from an output behavior of the shock sensor, whether the output of the shock sensor is an output due to a shock or an output due to power supply fluctuations; and a determination output step of supplying, as a determination result, an output indicative of power supply fluctuations when it is determined in at least any one of the first to third determining steps that the output is an output due to power supply fluctuations, and supplying, as a determination result, an output indicative of an output due to a shock when it is determined in all of the first to third determining steps that the output is an output due to a shock.

17. The storage according to claim 16, wherein, in the determining step, the detection sensitivity of the shock sensor is caused to be increased to generate a pseudo writing operation state corresponding to a writing operation state during a determination period in write disable, and the power supply voltage is forcefully fluctuated in a range not smaller than the rated voltage.

18. The storage according to claim 16, wherein, in the third determining step, an output signal of the shock sensor is integrated over a defined period, it is determined that the output is an output due to power supply fluctuations when an integration value is linearly changed, and it is determined that the output is an output due to a shock when the integration value is non-linearly changed.

19. The storage according to claim 16, wherein, in the third determining step, an output signal of the shock sensor is integrated over a defined period, a total sum of absolute values of differences with integration values with respect to a straight line connecting an integration initial value and an integration end value is calculated, it is determined that the output is an output due to power supply fluctuations when the difference total sum is either one of 0 and not larger than a predetermined value, and it is determined that the output is an output due to a shock when the difference total sum exceeds the predetermined value.

20. The storage according to claim 18, wherein, in the write disabling step, writing is disabled over the predetermined time also when a write fault associated with an execution of a write command is detected, and in the determining step, a determination operation is started in conjunction with the write disable associated with the write fault at the write disabling unit and, upon determination that the output is an output due to power supply fluctuations, the write disable is then immediately cleared and a retry in response to the write fault is caused to be performed.

* * * * *